US011958069B2

(12) United States Patent
Nyaribo et al.

(10) Patent No.: US 11,958,069 B2
(45) Date of Patent: Apr. 16, 2024

(54) CONTAINER FOR A SPRAYING DEVICE

(71) Applicant: 3M INNOVATIVE PROPERTIES COMPANY, St. Paul, MN (US)

(72) Inventors: Eric O. Nyaribo, Woodbury, MN (US); Stephen C. P. Joseph, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/072,617

(22) Filed: Nov. 30, 2022

(65) Prior Publication Data

US 2023/0096717 A1 Mar. 30, 2023

Related U.S. Application Data

(63) Continuation of application No. 17/091,034, filed on Nov. 6, 2020, now Pat. No. 11,541,407, which is a (Continued)

(51) Int. Cl.
*B05B 7/24* (2006.01)
*B65B 3/04* (2006.01)
*B65B 7/28* (2006.01)

(52) U.S. Cl.
CPC .......... *B05B 7/2408* (2013.01); *B05B 7/2478* (2013.01); *B05B 7/2481* (2013.01); *B65B 3/04* (2013.01); *B65B 7/2842* (2013.01)

(58) Field of Classification Search
CPC ... B05B 7/2408; B05B 7/2481; B05B 7/2478; B65B 3/04; B65B 7/2842
(Continued)

(56) References Cited

U.S. PATENT DOCUMENTS 1,395,965 A 11/1921 McLean et al.
1,583,927 A 5/1926 Hersler
(Continued)

FOREIGN PATENT DOCUMENTS

CA 2466801 A1 7/2011
CN 204710607 U 10/2015
(Continued)

OTHER PUBLICATIONS

DeKups Disposable Paint Cup System by DeVilbiss, Oct. 9, 2012, Product Video, [retrieved from the internet on Dec. 28, 2022], URL <DeKupsDisposablePaintCupSystembyDeVilbiss(English)-YouTube>, 3 pages.

(Continued)

*Primary Examiner* — Dariush Seif
(74) *Attorney, Agent, or Firm* — Jonathan V. Sry

(57) ABSTRACT

Fluid liners and container assemblies for a spraying apparatus and related methods of use are provided. The disclosed liners include a side wall defining a fluid-containing portion and an open end, a flange extending outwardly from the side wall, and a latching member coupled to the flange, where the latching member includes a retaining feature for releasably coupling the side wall to a lid compatible with the liner. Disclosed fluid containers include a lid having a fluid outlet adapted to couple the lid to the spraying apparatus and a collapsible liner, where either the liner or lid comprises a latch that releasably couples the liner and the lid to each other. Advantageously, the fluid liners and fluid containers can provide enhanced storage options for container contents between spraying operations.

19 Claims, 10 Drawing Sheets

Related U.S. Application Data continuation of application No. 15/101,439, filed as application No. PCT/US2014/067058 on Nov. 24, 2014, now Pat. No. 10,857,553.

(60) Provisional application No. 61/912,038, filed on Dec. 5, 2013.

(58) Field of Classification Search
USPC ............... 53/449; 220/495.01–495.11, 908.1
See application file for complete search history.

(56) References Cited

U.S. PATENT DOCUMENTS 1,732,691 A 10/1929 Mueller et al.
1,843,269 A 2/1932 Capser
1,968,173 A 7/1934 Russell
2,004,574 A 6/1935 Gee, Jr.
2,037,240 A 4/1936 Johnson
3,083,883 A 4/1963 Glidden
D200,960 S 4/1965 Beinert
3,192,589 A * 7/1965 Pearson .............. B29C 67/0044 74/DIG. 10
3,211,324 A 10/1965 Sapien
3,255,932 A 6/1966 Hunter et al.
3,255,972 A 6/1966 Hultgren et al.
3,271,059 A 9/1966 Pearson
3,401,842 A * 9/1968 Morrison .............. B05B 7/2481 220/300
D217,609 S 5/1970 Vicknair et al.
3,942,680 A 3/1976 Seeley et al.
4,151,929 A * 5/1979 Sapien .................. B05B 7/2408 220/373
D252,156 S 6/1979 Tabony et al.
4,270,668 A * 6/1981 Berfield ................. B65D 45/18 292/87
4,321,922 A * 3/1982 Deaton ................. A61M 1/604 604/319
4,388,997 A 6/1983 Grime
4,430,084 A * 2/1984 Deaton ................... A61M 1/00 206/520
4,460,361 A * 7/1984 Nichols ................. A61M 1/604 604/319
4,681,571 A 7/1987 Nehring
4,747,701 A * 5/1988 Perkins .................... B65D 5/60 383/73
4,824,018 A 4/1989 Shreve
4,834,260 A * 5/1989 Auten ....................... B65F 1/06 220/495.11
4,858,777 A 8/1989 Morel
4,951,875 A 8/1990 Devey
4,969,570 A * 11/1990 Harvey, Sr. ............ B65D 25/20 D9/434
D315,781 S 3/1991 Hart et al.
5,100,087 A 3/1992 Ashby
5,143,294 A * 9/1992 Lintvedt ............... B05B 7/2481 222/105
5,150,804 A 9/1992 Blanchet et al.
5,240,133 A 8/1993 Thomas, Jr.
5,261,553 A 11/1993 Mueller et al.
5,569,377 A * 10/1996 Hashimoto ............ B01D 29/56 210/930
5,582,350 A 12/1996 Kosmyna et al.
5,611,443 A 3/1997 King
5,650,215 A * 7/1997 Mazurek .................... C09J 7/38 428/156
5,740,939 A 4/1998 Muldner et al.
5,816,501 A 10/1998 Lopresti et al.
5,845,375 A 12/1998 Miller et al.
6,053,429 A 4/2000 Chang
6,126,048 A 10/2000 Bublitz
6,139,185 A * 10/2000 Hamilton ............... B65D 33/14 220/495.11
6,199,714 B1 * 3/2001 Thompson .............. B65F 1/068 220/495.07
6,315,851 B1 11/2001 Mazurek et al.
6,375,031 B1 4/2002 Kwan
6,435,426 B1 8/2002 Copp, Jr.
6,536,687 B1 3/2003 Navis et al.
6,547,161 B1 4/2003 Huang
D474,528 S 5/2003 Huang
6,588,681 B2 7/2003 Rothrum et al.
6,595,441 B2 7/2003 Petrie et al.
6,662,411 B2 12/2003 Rubenstein et al.
6,796,514 B1 * 9/2004 Schwartz .............. B05B 7/2408 239/74
6,820,824 B1 * 11/2004 Joseph .................... B29C 51/08 239/377
6,824,378 B2 * 11/2004 King ..................... B29C 33/424 425/363
6,910,594 B2 * 6/2005 Foley ...................... A61J 9/001 215/11.1
6,938,836 B2 9/2005 Bouic
6,953,127 B1 * 10/2005 Esser ..................... B65D 90/24 220/23.91
6,953,155 B2 10/2005 Joseph et al.
7,032,839 B2 4/2006 Blette et al.
7,036,752 B1 5/2006 Hsiang
7,080,750 B2 * 7/2006 Wein ....................... B65F 1/062 220/495.07
7,083,119 B2 8/2006 Bouic et al.
7,159,734 B1 * 1/2007 O'Brien ................. B44D 3/123 220/495.07
7,188,785 B2 3/2007 Joseph et al.
D542,376 S 5/2007 Blette et al.
7,353,973 B2 4/2008 Rohr
7,374,111 B2 * 5/2008 Joseph .................... B05B 7/247 141/2
D574,926 S 8/2008 Huang
7,410,106 B2 8/2008 Escoto, Jr. et al.
7,416,140 B2 8/2008 Camilleri et al.
7,513,443 B2 4/2009 Escoto, Jr. et al.
D607,807 S 1/2010 Ohlhorst
7,694,896 B2 4/2010 Turnbull et al.
D616,961 S 6/2010 Goetz
7,789,324 B2 9/2010 Bouic et al.
7,819,341 B2 10/2010 Schmon et al.
7,878,425 B2 * 2/2011 Handzel .................. B05B 7/241 141/2
D640,587 S 6/2011 Tanaka
D642,863 S 8/2011 Tobias
8,016,209 B2 9/2011 Hess et al.
8,033,413 B2 10/2011 Gerson et al.
8,066,205 B2 11/2011 Bass et al.
D656,583 S 3/2012 Hudson, Jr. et al.
8,127,963 B2 * 3/2012 Gerson ................. B05B 7/2408 222/105
8,196,770 B2 6/2012 Kosmyna et al.
8,297,536 B2 10/2012 Ruda
D679,146 S 4/2013 Rincon
8,444,067 B2 5/2013 Schmon et al.
D692,530 S 10/2013 Gehrung
8,563,264 B2 * 10/2013 Halverson ............. B01L 3/5029 604/1
8,569,072 B2 * 10/2013 Halverson ................ G01N 1/38 435/7.1
8,590,809 B2 11/2013 Escoto, Jr. et al.
D697,583 S 1/2014 Schmon et al.
8,648,282 B2 * 2/2014 Garcia .................. A47J 27/004 220/322
D705,899 S 5/2014 Abernethy et al.
8,844,840 B2 9/2014 Lawrence
8,857,649 B2 10/2014 Buchholz
D717,104 S 11/2014 Redfern
D719,637 S 12/2014 Pagliai
8,925,836 B2 1/2015 Dettlaff et al.
8,944,351 B2 2/2015 Pellegrino et al.
8,998,018 B2 4/2015 Pellegrino et al.
9,038,674 B2 5/2015 Steele
D739,242 S 9/2015 Pitera et al.
9,162,240 B2 10/2015 Gerson et al.
9,174,231 B2 11/2015 Shultz et al.
D747,497 S 1/2016 Bell

(56) References Cited

U.S. PATENT DOCUMENTS

| | | | | |
|---|---|---|---|---|
| 9,227,208 | B2 | 1/2016 | Lin | |
| D755,345 | S | 5/2016 | Lüthi | |
| D755,575 | S | 5/2016 | Pratt | |
| 9,335,198 | B2 | 5/2016 | Pellegrino et al. | |
| D758,533 | S | 6/2016 | Dettlaff | |
| D779,632 | S | 2/2017 | Johnson et al. | |
| 9,586,220 | B2 | 3/2017 | Pellegrino et al. | |
| D792,556 | S | 7/2017 | Hegdahl et al. | |
| D793,530 | S | 8/2017 | Hegdahl et al. | |
| D793,531 | S | 8/2017 | Hegdahl et al. | |
| 9,815,076 | B2 | 11/2017 | Schulz et al. | |
| 10,882,064 | B2 | 1/2021 | Pellegrino et al. | |
| 11,040,360 | B2 * | 6/2021 | Gerson | B05B 7/2408 |
| 11,406,993 | B2 * | 8/2022 | Comstock | B05B 12/002 |
| 2003/0006310 | A1 | 1/2003 | Rothrum et al. | |
| 2003/0198502 | A1 | 10/2003 | Maloney et al. | |
| 2004/0256484 | A1 | 12/2004 | Joseph et al. | |
| 2005/0092770 | A1 | 5/2005 | Yechouron | |
| 2005/0139621 | A1 | 6/2005 | Foster | |
| 2005/0156058 | A1 | 7/2005 | Kosmyna et al. | |
| 2006/0000927 | A1 | 1/2006 | Ruda | |
| 2006/0017286 | A1 * | 1/2006 | Kosmyna | B05B 7/2408<br>285/305 |
| 2006/0175433 | A1 | 8/2006 | Escoto, Jr. et al. | |
| 2006/0196891 | A1 * | 9/2006 | Gerson | B05B 7/2481<br>222/105 |
| 2006/0251473 | A1 | 11/2006 | Tyski | |
| 2006/0261185 | A1 * | 11/2006 | Joseph | B05B 7/2408<br>239/525 |
| 2006/0283861 | A1 * | 12/2006 | Kosmyna | B05B 7/2478<br>220/495.01 |
| 2007/0158348 | A1 * | 7/2007 | Kosmyna | B05B 7/2478<br>220/23.87 |
| 2007/0158361 | A1 * | 7/2007 | Koyama | B05B 7/2478<br>239/323 |
| 2007/0158462 | A1 * | 7/2007 | Delbridge | B05B 7/2408<br>239/323 |
| 2007/0269341 | A1 * | 11/2007 | Halverson | G01N 1/34<br>422/400 |
| 2007/0272323 | A1 * | 11/2007 | Verhaeghe | B05B 7/2408<br>141/114 |
| 2008/0011754 | A1 * | 1/2008 | Ramsey | B65F 1/06<br>220/495.06 |
| 2008/0011879 | A1 | 1/2008 | Gerson et al. | |
| 2008/0023480 | A1 * | 1/2008 | Fisher | B65F 1/06<br>220/495.06 |
| 2008/0041857 | A1 * | 2/2008 | Johnson | B65D 45/26<br>220/318 |
| 2008/0223087 | A1 | 9/2008 | Veldman | |
| 2008/0265059 | A1 * | 10/2008 | Escoto | B05B 7/2481<br>239/328 |
| 2008/0310772 | A1 * | 12/2008 | Dayton | B65F 1/062<br>383/62 |
| 2009/0200309 | A1 | 8/2009 | Kosmyna et al. | |
| 2010/0181323 | A1 * | 7/2010 | Thaler | B65D 43/0254<br>220/574 |
| 2010/0288772 | A1 | 11/2010 | Wambeke et al. | |
| 2010/0288787 | A1 | 11/2010 | Jäckel | |
| 2011/0108579 | A1 | 5/2011 | Martorell Pena et al. | |
| 2012/0000992 | A1 | 1/2012 | Shih | |
| 2012/0132550 | A1 * | 5/2012 | Gerson | B05B 7/2408<br>220/495.08 |
| 2012/0217247 | A1 * | 8/2012 | Adkins | B65F 1/06<br>220/495.08 |
| 2012/0273583 | A1 * | 11/2012 | Gerson | B05B 7/2481<br>222/105 |
| 2012/0280062 | A1 | 11/2012 | Pellegrino et al. | |
| 2012/0282009 | A1 | 11/2012 | Geuther | |
| 2012/0291890 | A1 | 11/2012 | Pan | |
| 2013/0001322 | A1 | 1/2013 | Pellegrino et al. | |
| 2013/0056471 | A1 * | 3/2013 | Ervin | B65F 1/06<br>220/495.08 |
| 2013/0105598 | A1 * | 5/2013 | Shultz | B05B 9/043<br>383/105 |
| 2013/0153683 | A1 | 6/2013 | Lawrence | |
| 2013/0186981 | A1 | 7/2013 | Burns | |
| 2013/0221130 | A1 | 8/2013 | Joseph et al. | |
| 2013/0327819 | A1 * | 12/2013 | Baker | B65D 25/00<br>229/117.01 |
| 2014/0014741 | A1 | 1/2014 | Escoto, Jr. et al. | |
| 2014/0103143 | A1 | 4/2014 | Lin | |
| 2014/0151377 | A1 * | 6/2014 | Ross | B65D 77/06<br>493/189 |
| 2014/0178126 | A1 | 6/2014 | Burns | |
| 2014/0203098 | A1 | 7/2014 | Bierie | |
| 2015/0060568 | A1 | 3/2015 | Johnson et al. | |
| 2015/0108135 | A1 * | 4/2015 | Hanna | B05B 7/2481<br>220/495.06 |
| 2015/0360812 | A1 | 12/2015 | Gerson et al. | |
| 2016/0052002 | A1 | 2/2016 | Schulz et al. | |
| 2016/0271632 | A1 | 9/2016 | Bierie | |
| 2016/0303594 | A1 * | 10/2016 | Nyaribo | B05B 7/2408 |
| 2018/0333730 | A1 * | 11/2018 | Gerson | B05B 7/2405 |
| 2019/0009289 | A1 * | 1/2019 | Pitera | B05B 7/2408 |
| 2019/0015858 | A1 | 1/2019 | Hegdahl et al. | |
| 2021/0053079 | A1 * | 2/2021 | Nyaribo | B05B 7/2408 |
| 2022/0080435 | A1 * | 3/2022 | Joseph | B65D 43/08 |
| 2022/0105745 | A1 * | 4/2022 | D'Epenoux | B05B 7/2408 |

FOREIGN PATENT DOCUMENTS

| | | | |
|---|---|---|---|
| DE | 89022238 | U1 | 1/2001 |
| DE | 20202123 | U1 | 2/2003 |
| DE | 10315426 | A1 | 6/2004 |
| DE | 202004003116 | U1 | 7/2005 |
| DE | 102009034715 | A1 | 1/2011 |
| DE | 102007039106 | B4 | 6/2022 |
| EP | 0258015 | B1 | 12/1993 |
| EP | 1566223 | B1 | 11/2007 |
| EP | 1402957 | B1 | 12/2008 |
| EP | 1990099 | B1 | 1/2011 |
| EP | 2203256 | B1 | 3/2011 |
| EP | 2383044 | A1 | 11/2011 |
| EP | 2545999 | A1 | 1/2013 |
| EP | 2457665 | B1 | 12/2015 |
| EP | 2450108 | B1 | 11/2016 |
| EP | 2982443 | B1 | 4/2017 |
| JP | 58183456 | A | 10/1983 |
| JP | 06335643 | A | 12/1994 |
| JP | 3052058 | B2 | 6/2000 |
| JP | 6346960 | B2 | 6/2018 |
| NL | 1033999 | C2 | 12/2008 |
| WO | 199416957 | A1 | 8/1994 |
| WO | 199832539 | A1 | 7/1998 |
| WO | 2002085533 | A1 | 10/2002 |
| WO | 2003045575 | A1 | 6/2003 |
| WO | 2004037433 | A1 | 5/2004 |
| WO | 2004052552 | A1 | 6/2004 |
| WO | 2004060574 | A1 | 7/2004 |
| WO | 2005018815 | A2 | 3/2005 |
| WO | 2005075096 | A1 | 8/2005 |
| WO | 2006055138 | A1 | 5/2006 |
| WO | 2007149760 | A2 | 12/2007 |
| WO | 2008156357 | A1 | 12/2008 |
| WO | 2009090273 | A1 | 7/2009 |
| WO | 2010085801 | A2 | 7/2010 |
| WO | 2011047876 | A2 | 4/2011 |
| WO | 2011097787 | A1 | 8/2011 |
| WO | 2013063231 | A1 | 5/2013 |
| WO | 2013164759 | A1 | 11/2013 |
| WO | 2014182722 | A1 | 11/2014 |
| WO | 2014182871 | A1 | 11/2014 |
| WO | 2016081977 | A1 | 6/2016 |
| WO | 2017123708 | A1 | 7/2017 |
| WO | 2017123709 | A1 | 7/2017 |
| WO | 2017123714 | A1 | 7/2017 |
| WO | 2017123715 | A1 | 7/2017 |

(56) References Cited

FOREIGN PATENT DOCUMENTS

| | | |
|---|---|---|
| WO | 2017123718 A1 | 7/2017 |
| WO | 2018109594 A1 | 6/2018 |

OTHER PUBLICATIONS

DeVilbiss, "The New Generation in Disposable Paint Cup Systems", DeKups® Product Information, 2 pages.

Ebertowskietal., U.S. Appl. No. 62/279,537, "Button-Lock Fluid Connector for Hand-Held Spray Guns," filed Jan. 15, 2016.

International Search Report for PCT International Application No. PCT/US2017/013118, dated Apr. 25, 2017, 4 pages.

International Search Report for PCT International Application No. PCT/US2017/013121, dated Jun. 13, 2017, 7 pages.

Kenna, "Eccentricity in Ellipses", Mathematics Magazine, Jan.-Feb. 1959, vol. 32, No. 3, pp. 133-135.

Oppermann, Dictionary of Modern Technology, Edition 1990, pp. 1594-1595.

Wikipedia,—Push-to-pull compression fittings, Aug. 20, 2021, 1 page.

* cited by examiner

CONTAINER FOR A SPRAYING DEVICE

CROSS-REFERENCE TO RELATED APPLICATIONS

This application is a continuation of U.S. patent application Ser. No. 17/091,034, filed Nov. 6, 2020, which is a continuation of U.S. patent application Ser. No. 15/101,439, filed Jun. 3, 2016, which is a national stage filing under 35 U.S.C. 371 of PCT/US2014/067058, filed Nov. 24, 2014, which claims the benefit of U.S. Provisional Application No. 61/912,038, filed Dec. 5, 2013, the disclosures of which are incorporated by reference in their entireties herein.

FIELD OF THE INVENTION

Provided are containers and related methods of use for a spraying apparatus. More particularly, containers are provided for use with fluid spraying devices including, for example, spray guns and spray head assemblies.

BACKGROUND

Handheld spray guns are commonly used in a variety of commercial and industrial applications, including for example automotive refinishing. Such spray guns can be used with any of a number of coating media, including primers, paints, clearcoat, slurries, fine powders, and other fluid media capable of being atomized and directed through a spray nozzle onto a substrate. Applications for spray guns include painting and texturizing architectural surfaces such as walls and ceilings, as well as painting and body repair for marine and automotive exteriors.

Spray guns usually have a reusable gun platform connected with a compressed air source and liquid pipeline in communication with a spray nozzle. The air and liquid are generally directed into a flow channel, where the air atomizes the liquid into fine droplets that are propelled out of the nozzle. Some spray gun setups, including some used in automotive and industrial refinishing applications, have fluid reservoirs that use disposable collapsible liners that are received in rigid containers called paint cups. Commonly, these reservoirs also employ disposable lids and a corresponding retaining collar that releasably couples the lid to the rigid container. Advantageously, the liner and lid collectively protect the non-disposable components from becoming exposed to the paint, or other fluid, to be dispensed. After use, the liner and lid can be removed together from the rigid paint cup and discarded. These configurations are used, for example, in the PPS brand Paint Preparation System and HG ACCUSPRAY brand System (3M Company, St. Paul, MN).

SUMMARY

The fluid containers used in spray gun systems can vary substantially in volumetric capacity depending on the application at hand. While handheld spray guns typically use fluid containers ranging in size from 6 to 28 fluid ounces, bulk spray applications often involve containers that are considerably larger. Use of a large fluid container can help minimize waste associated with fluid transfer and cleanup procedures for large scale applications.

One of the technical problems associated with large volume containers relates to the handling and storage of the container contents. Following a spraying operation, fluid remaining in the container is usually transferred or stored by removing a retaining collar from the rigid outer cup, then lifting out the disposable lid and liner together along with the fluid. The lid and liner themselves are either not attached or attached to each other by a relatively weak interference fit. If the amount of fluid in the container is substantial, then the lid has a tendency to spontaneously detach from the liner and cause spillage of the fluid contents. This problem is exacerbated when dealing with modern, high-solids coating fluids for low volatile organic compound (or "VOC") applications, which can put a significant strain on the coupling between the lid and liner.

The problem also extends to storage of the container contents between spraying operations. Even after the lid and liner are removed from the cup, the coupling between these components may not be sufficient to withstand the positive pressure therein, resulting in fluid leakage. Such pressurization can be induced by any of a number of factors. For example, volatility of the fluid contents can lead to an expansion of the gases within the liner/lid, creating positive pressure over time and rupturing the seal between the lid and liner. Nominal increases in temperature can also lead to such positive pressure.

The containers, assemblies, and related methods described herein overcome the foregoing technical difficulties and provide substantial time-savings and other conveniences for the spray gun operator.

In one aspect, a liner for a fluid container is provided. The liner comprises: a side wall defining a fluid-containing portion and an open end; a flange extending outwardly from the side wall; and a latching member coupled to the flange, the latching member comprising a retaining feature for releasably coupling the side wall to a lid compatible with the liner.

In another aspect, a fluid container for a spraying apparatus is provided, comprising: a lid having a fluid outlet adapted to couple the lid to the spraying apparatus; and a liner that collapses as a fluid contained within the liner is withdrawn from the container, wherein either the liner or lid comprises a latch that releasably couples the liner and the lid to each other.

In still another aspect, a method of storing a fluid in a container is provided. The method comprises: transferring the fluid into a collapsible liner; placing the liner at least partially within a rigid cup; at least partially covering an open end of the liner with a lid; and moving a latching member of either the liner or the lid from a first position where the liner and lid are separable to a second position where the liner and lid are secured to each other.

The above summary is not intended to describe each embodiment or every implementation of the fluid containers described herein. Rather, a more complete understanding of the invention will become apparent and appreciated by reference to the following Detailed Description and Claims along with accompanying figures of the drawings.

DEFINITIONS

As used herein:

"Latch" refers to a device having parts or surfaces that engage each other to fasten one object to another.

"Latching member" refers to one component of a latch.

"Microreplicated surface" refers to a surface having a three dimensional surface pattern made by impressing or casting the surface pattern with a tooled surface having a negative impression of the surface pattern.

"Pressurized gas" refers to gas under greater than atmospheric pressure.

DETAILED DESCRIPTION

As used herein, the terms "preferred" and "preferably" refer to embodiments described herein that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention.

Figure 1:
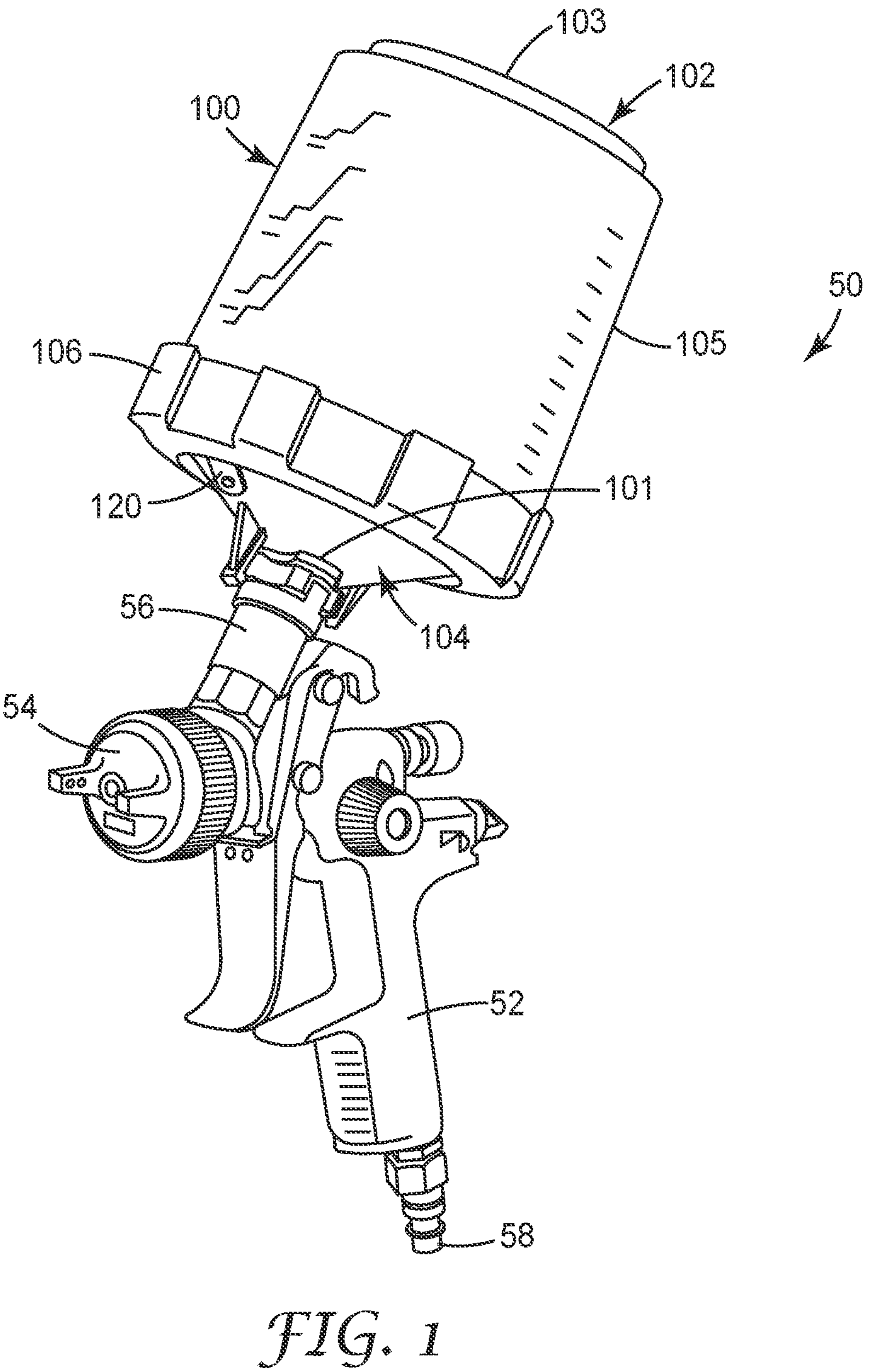
FIG. 1 is a perspective view of a spray gun assembly including a fluid container according to one exemplary embodiment, looking toward the front and side surfaces of the assembly.
Figure 2A:
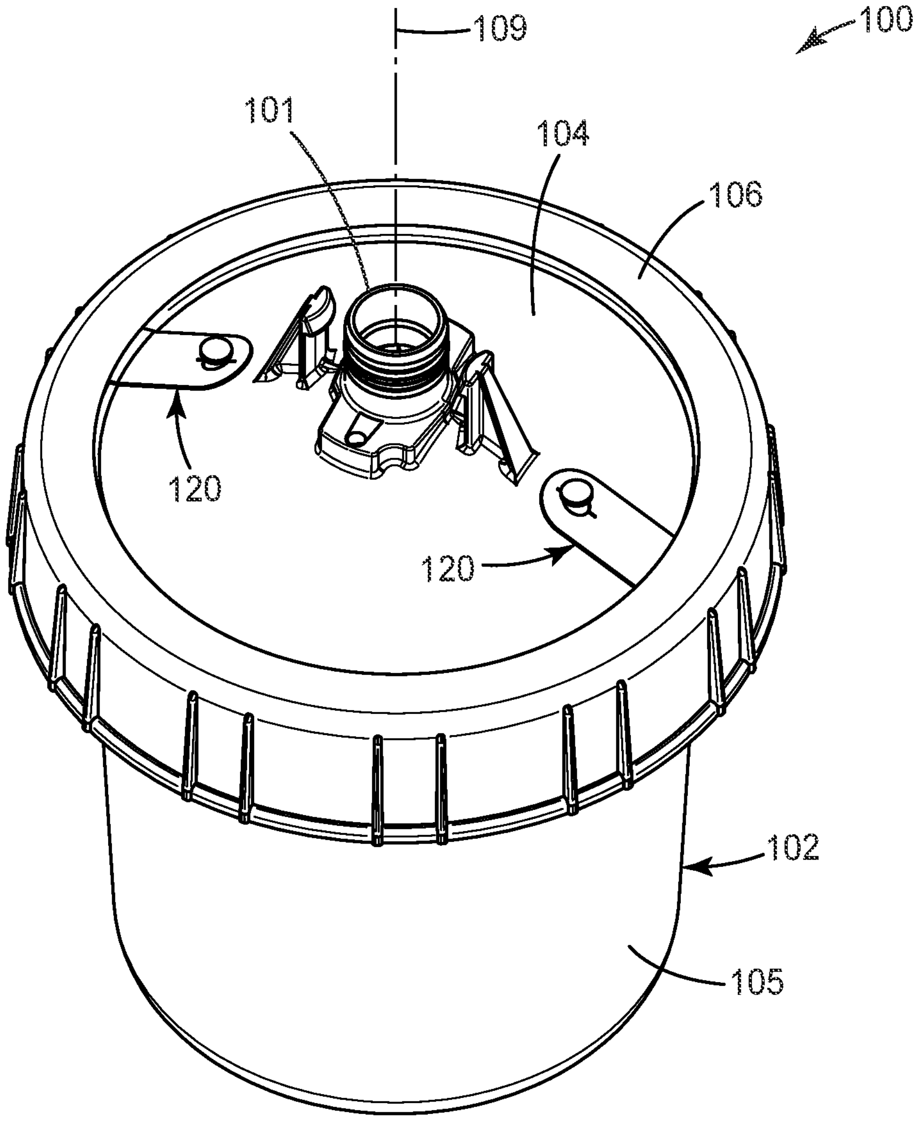
FIG. 2A is a perspective view of the container of FIG. 1, looking toward its top and side surfaces.
Figure 2B:
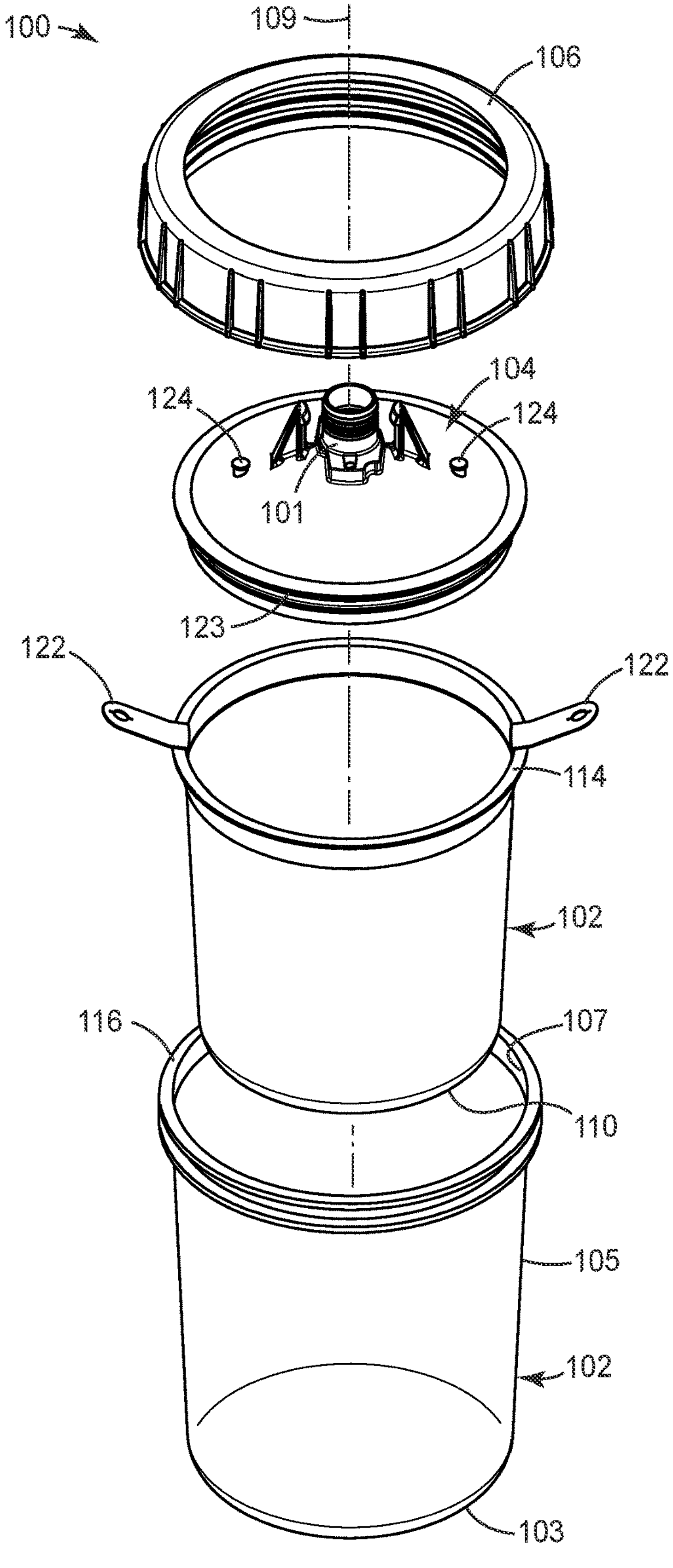
FIG. 2B is an exploded perspective view of the container of FIGS. 1 and 2A, looking toward its top and side surfaces.

A fluid container according to one exemplary embodiment is shown in FIGS. 1, 2A, and 2B and designated by the numeral 100. The fluid container 100 is a modular component that can be coupled to a suitable spraying apparatus. General characteristics of the spraying apparatus are shown in FIG. 1, with further details provided with respect to FIGS. 2A and 2B and subsequent figures.

Referring to FIG. 1, the fluid container 100 represents one component of a handheld spray gun assembly 50 that also includes a spray gun platform 52 and a nozzle assembly 54. In the embodiment shown, the fluid container 100 is releasably coupled to a fluid adapter 56, which is in turn coupled to the spray gun platform 52. The spray gun platform 52 has an air inlet 58 connected to a source of pressurized gas, typically air, used to atomize the fluid prior to its discharge from the nozzle assembly 54.

In some embodiments, the fluid container 100 is operatively coupled to an integrated nozzle assembly that includes a fluid inlet releasably coupled to the fluid container 100. Preferably, the integrated nozzle assembly is disposable, as described in PCT Application No. WO 2010/085801 (Escoto, et al.). Advantageously, such a configuration directs the fluid through the nozzle assembly while minimizing or avoiding altogether fluid contact with the spray gun platform, thereby reducing the need for the operator to clean the spray gun platform.

As shown, the fluid container 100 includes a rigid outer cup 102, a lid 104, and an outer collar 106. In the illustration, the cup 102 has a bottom wall 103 and a cylindrical side wall 105 (symmetrical about longitudinal axis 109) that collectively define an open end 107 (visible in FIG. 2B). When the container 100 is assembled, as shown, the lid 104 extends over open end 107 of the cup 102, where the cup 102 and outer collar 106 are releasably coupled to each other in encircling relation, thereby securing both the liner 108 and the lid 104 to the cup 102.

In the particular embodiment shown, the cup 102 has a threaded screw-type connection with the outer collar 106, allowing the outer collar 106 to be securely tightened against the cup 102 by clockwise rotation. The lid 104 is disposed between the open end 107 of the cup 102 and the outer collar 106 of the lid 104, allowing a fluid-tight seal to be formed between the lid 104 and a liner 108 (not visible in FIG. 1) when the outer collar 106 is tightened. Advantageously, this configuration also provides an air-tight seal between the liner 108 and the cup 102, allowing the liner 108 to be externally pressurized if desired.

In some embodiments, the bottom wall of the cup 102 is omitted, with the cup 102 instead having two open ends that are diametrically opposed to each other. Such a configuration could be useful, for example, in cases where the cup 102 is not normally pressurized during a spraying operation.

Optionally and as shown, the cup 102 is either transparent or translucent and has horizontal volumetric markings or other visual indicia to assist the operator in measuring the quantities of fluid received in the fluid container 100. If desired, such indicia could be provided on a translucent or transparent indicating sheet that is inserted into the cup 102 along the inner surface of the side wall 105. Alternatively, the indicating sheet could be wrapped around the outer surface of the side wall 105. The cup 102 itself is preferably made from a rigid material, such as a clarified polypropylene, and has a wall thickness sufficient to prevent the cup 102 from changing shape when filled and/or pressurized.

The lid 104 includes a fluid outlet 101 adapted for connecting the fluid container 100 to the fluid adapter 56, which is in turn adapted for coupling to a spraying apparatus such as the spray gun platform 52. In high volume applications where large volumes of fluid are involved, the fluid outlet 101 may instead be adapted for releasable connection to a high pressure fluid line.

FIGS. 2A and 2B show, more particularly, the fluid container 100 in respective assembled and exploded configurations. FIG. 2B reveals, in particular, the arrangement of the outer collar 106, the lid 104, the flexible liner 108, and the cup 102 relative to each other.

During storage, the coating fluid is normally contained in the enclosed or semi-enclosed space provided between the lid 104 and the liner 108. Optionally and as shown, the liner 108 has a size and shape generally conforming to the inner surfaces of the bottom wall 103 and side wall 105 of the cup 102. Similar to the cup 102, and as illustrated in FIG. 2B, the liner 108 has a bottom wall 110 and a cylindrical side wall 112 defining a fluid-containing portion and presenting an open end through which the contents of the liner 108 are dispensed when operating the spray gun assembly 50.

The liner 108 additionally includes a flange 114 that extends outwardly from the side wall 112 along a plane perpendicular to the axis 109. When the container 100 is assembled, the flange 114 of the liner 108 resides between, and flatly engages, both the lid 104 and a terminal edge 116 of the side wall 105 of the cup 102. Particular options and advantages associated with the use of a lined fluid reservoir such as container 100 are described in detail in PCT Publication No. WO 98/32539 (Joseph, et al.).

It is to be understood that the shapes and sizes of the foregoing components in the illustrations are merely exemplary and alternative constructions are possible. For example, the cup 102, lid 104, and liner 108 could also have a generally rectangular or elliptical cross-section, so long as the functionality of the container 100 is preserved.

As further shown in FIGS. 2A and 2B, the fluid container 100 includes a pair of latches 120 disposed on opposite sides of the fluid outlet 101. In this exemplary embodiment, each latch 120 includes a tab 122 and a protrusion 124 disposed on the flange 114 and lid 104, respectively. Further details concerning the structure and operation of these latches 120 will be provided later with respect to FIG. 4.

Figure 3:
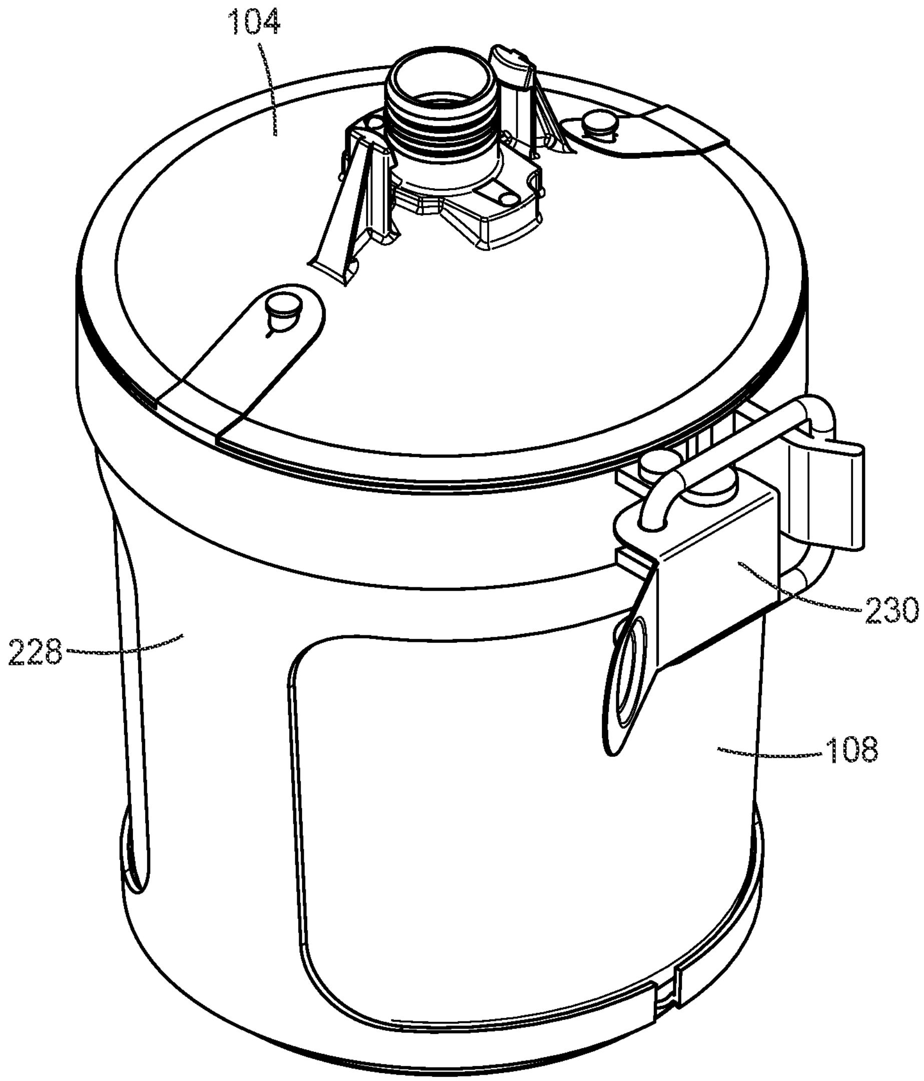
FIG. 3 is a perspective view of an alternative embodiment of the container of FIGS. 1-2, looking toward its top and side surfaces.

FIG. 3 shows a variant of the above container embodiment in which both the outer collar 106 and cup 102 are omitted. Instead, a frame member 228 partially surrounds the liner 108 and provides supporting structure that optionally extends along the circumference of the cup 108 along portions of the side wall 105 and/or the bottom wall 110. Instead, the frame member 228 uses a buckle 230 positioned adjacent the lid 104, where the buckle 230 is mutually coupled to sections of the frame member 228 that are spaced apart from each other along the circumference of the liner 108. The buckle 230 toggles between a first position in which the frame member 228 fits loosely over the liner 108, and a second position in which the frame member 228 applies compression to the liner 108. When the buckle 230 is in its second position, the liner 108 is compressed between the frame member 228 and the lid 104, thus forming a fluid-tight seal between these components. The buckle 230 therefore serves a similar function to that of the outer collar 106 by preventing fluid leakage along the seam between the lid 104 and liner 108.

In still other embodiments, the container 100 includes only the lid 104 and the liner 108, with both the cup 102 and the frame member 228 omitted. Such a configuration could be advantageously used in cases where there is essentially no pressurization of the fluid needed to transfer the fluid from the container 100 to the atomizer in the nozzle assembly 54.

The pair of latches 120 are further described with reference to FIG. 4, which shows the latches 120 located at diametrically opposite sides of the lid 104. The latches 120 releasably couple the liner 108 and the lid 104 to each other. Each latch 120 includes a tab 122 that is pivotally coupled to the flange 114 (shown in FIG. 2B) of the liner 108 by a respective hinge 121, whereby the tab 122 can pivot about the hinge 121 between a closed position in which the lid 104 and liner 108 are mutually coupled and an open position in which the lid 104 and liner 108 are not mutually coupled.

Figure 4:
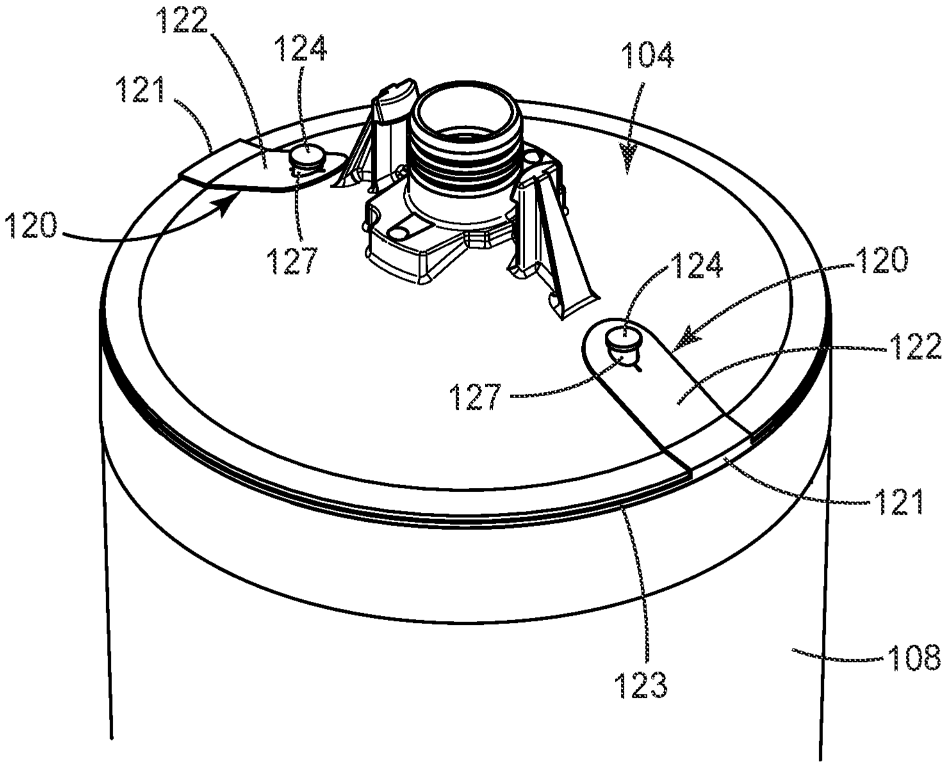
FIG. 4 is a perspective view of a subassembly associated with the container of FIGS. 1-2, looking toward its top and side surfaces.

In the closed position shown in FIG. 4, the tab 122 protrudes inwardly from its hinge 121 towards the axis 109, extending across an outer perimeter 123 of the lid 104 as viewed from a direction along the axis 109. To release the latch 120, the tab 122 can be pivoted about the hinge 121 to a position where it extends away from the axis 109, in which the tab 122 no longer extends across the outer perimeter 123 of the lid 104. This pivoting motion, in turn, can be achieved by pinching a distal end 122' of the tab 122 between, for example, thumb and forefinger and then pulling back the distal end 122' away from the lid 104 in a peeling motion.

In the latch embodiments described herein, the tab 122 provides a first surface that can be brought to bear against a second, opposing surface located on the lid 104. In the example of FIG. 4, each of the tabs 122 has a receptacle 127 that engages, in encircling relation, a respective protrusion 124 located on the top surface of the lid 104. Optionally and as shown, each protrusion 124 has a slightly oversized head 125 such that there is an interference fit between each receptacle 127 and its mating protrusion 124 that effectively locks these members together. Advantageously, this interference fit can prevent the tabs 122 from becoming inadvertently detached from the lid 104. Optionally and as shown, the receptacle 127 is an aperture that passes through the tab 122. Alternatively, the receptacle 127 may extend only part way through the tab 122 and include undercut features that engage and retain the oversized head 125 of the protrusion 124 when the latch 120 is in its closed (i.e. latched) position.

Preferably, the latching members that comprise the latches 120, particularly the tabs 122, hinges 121, and protrusions 124, have a suitable configuration, size and material strength whereby the liner 108 can be filled to its capacity with a high solids, low VOC fluid and then suspended securely from the lid 104 without risk of detachment and/or leakage. In some embodiments, the liner 108 has a fluid capacity of at least about 830 milliliters (28 fluid ounces), at least about 1180 milliliters (40 fluid ounces), or at least about 1900 milliliters (64 fluid ounces). In some embodiments, the liner 108 has a fluid capacity of at most about 1000 milliliters (34 fluid ounces), at most about 1900 milliliters (64 fluid ounces), or at most about 2400 milliliters (80 fluid ounces).

Figure 5:
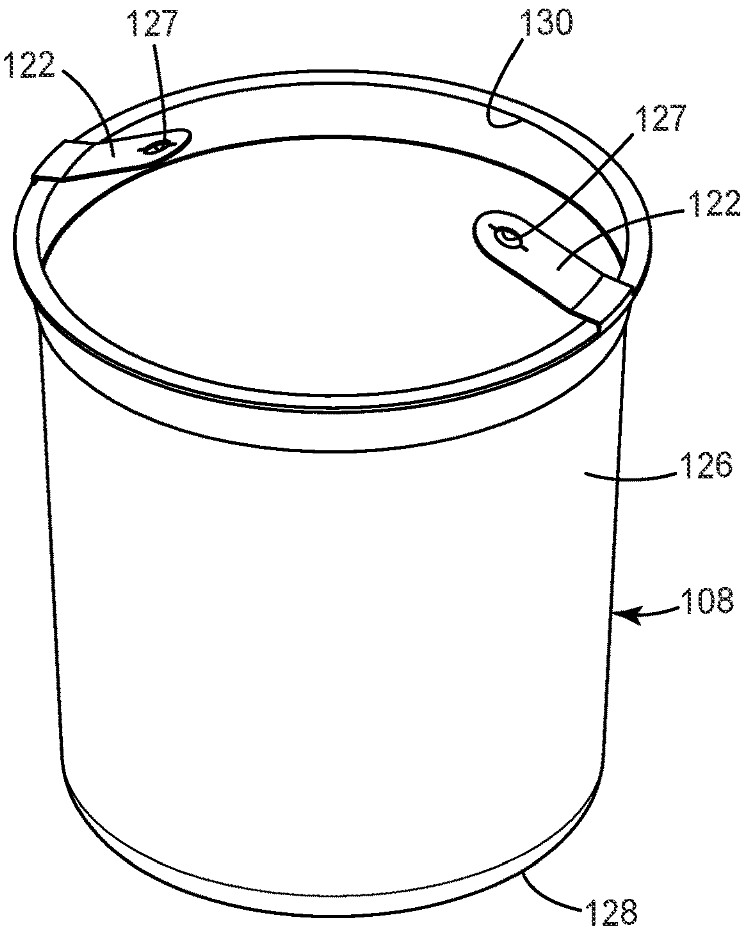
FIG. 5 is a perspective view of a first component of the subassembly of FIG. 4, looking toward its top and side surfaces.
Figure 6:
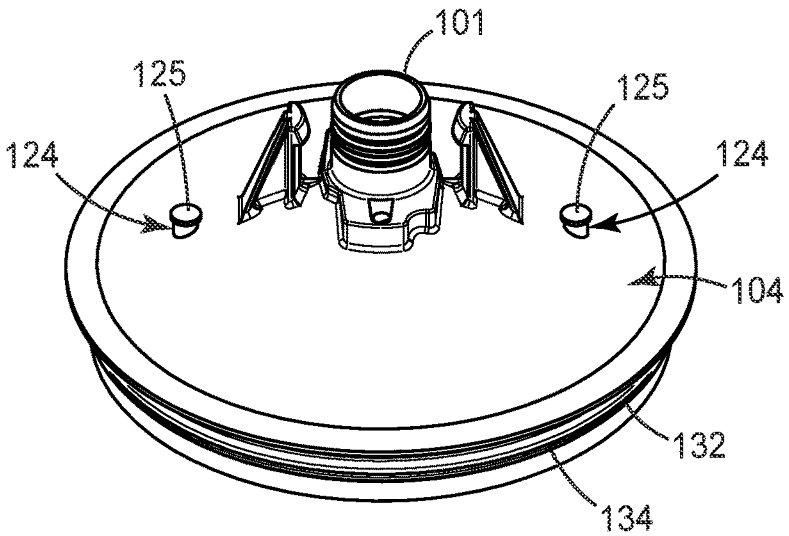
FIG. 6 is a perspective view of a second component of the subassembly of FIG. 4, looking toward its top and side surfaces.

FIGS. 5 and 6 show the liner 108 and the lid 104, respectively, as individual components to reveal additional details of this exemplary embodiment. For example, the liner 108 has a cylindrical side wall 126, flat bottom wall 128, and open end 130 that generally conform to corresponding inner surfaces of the cup 102 when the container 100 is assembled. With the container 100 assembled, the open end 130 of the liner 108 is generally aligned with the open end 107 of the cup 102.

Generally, the liner 108 has relatively thin walls that enable the liner 108 to collapse under positive external pressure and/or negative internal pressure as its fluid contents are withdrawn and dispensed from the spraying apparatus. It is also preferable, however, that the liner 108 has sufficient structural rigidity to stand entirely self-supported on a horizontal surface to allow an operator to pour a fluid into its open end 130 without deforming its shape. Alternatively, the liner 108 could be configured to deform to, for example, increase its fluid capacity for the application at hand.

The lid 104 preferably has a configuration that is compatible with that of the liner 108. FIG. 6 shows an enlarged view of the lid 104, revealing an optional inner collar 132 located on the bottom side of the lid 104. The inner collar 132 extends along the outer perimeter of the lid 104 and includes a raised ridge 134 that extends along the circumference of the inner collar 132. When the lid 104 and the liner 108 are fully secured to each other (as illustrated in FIG. 2A), the outer surface of the inner collar 132 contacts the inner surface of the liner 108. In this embodiment, the raised ridge 134 is sized to produce a snug, interference fit along these contact surfaces between the inner collar 132 and the liner 108 when the container 100 is assembled.

In some embodiments, the latch 120 includes a camming member that operates to pry the liner 108 and the lid 104 apart from each other as the latch 120 pivots from its closed position to its open position. This can be especially advantageous when there is resistance to separating the lid 104 from the liner 108, as may be the case if there is an interference fit between these components. As another possibility, the tabs 122 can act as an anchor points (that may be pinched between thumb and forefinger, for example) for facilitating release of the lid 108 from the liner 108 when there is a tight engagement between these components. The existence of these anchor points can allow a user to hold the liner 108 during separation of the liner 108 from the lid 104 without deforming the liner 108 and potentially spilling its contents.

Figure 7A:
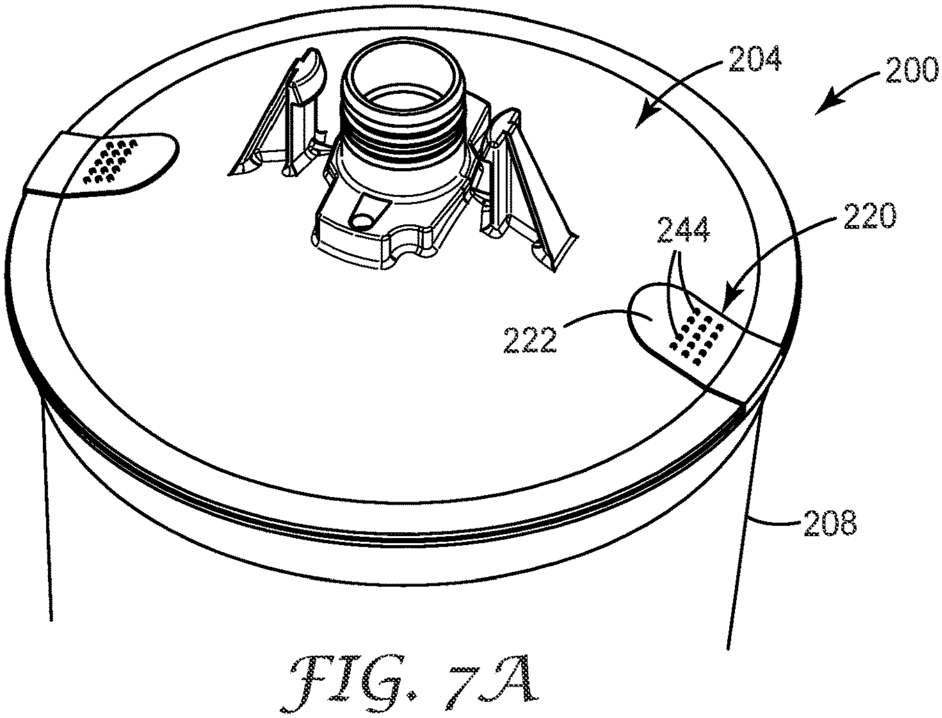
FIG. 7A is a perspective views of a fluid container subassembly according to another exemplary embodiment, looking toward its top and side surfaces.
Figure 7B:
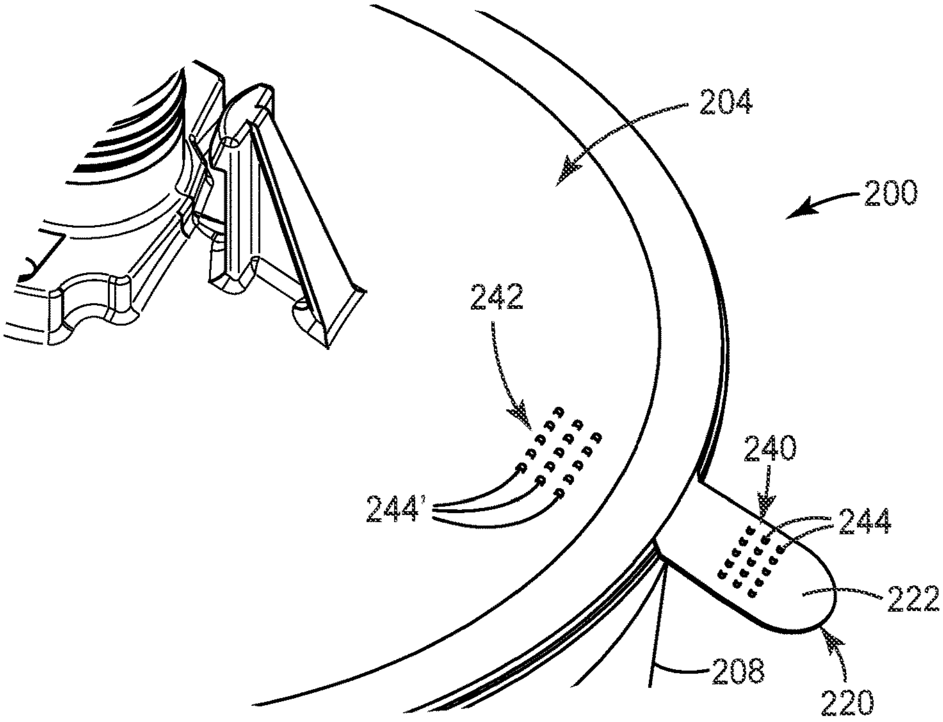
FIG. 7B is a perspective views of a component of the subassembly of FIG. 7A, looking toward its top and side surfaces.

As shown in subsequent figures, the latches and latching members can implement various types of retaining features. FIGS. 7A and 7B, for example, show a container 200 according to an alternative embodiment. Like the container 100, the container 200 has a liner 208, lid 204, and a pair of latches 220 that releasably couple the lid 204 and liner 208 to each other. The container 200 is distinguished from the prior embodiment in that each latch 220 includes opposing surfaces 240, 242 having inverse microreplicated surfaces. These microreplicated surfaces are characterized by three-dimensional features 244, 244', located on a tab 222 and an opposing surface on the lid 204, that mechanically interlock with each other. As shown in FIGS. 7A and 7B, the features 244, 244' are tiny cylindrical posts and matching cylindrical cavities. Other types of microreplicated surfaces include, but are not limited to, pyramids, grooves, cones, prisms, spheres, and ellipsoids. Various microreplicated surfaces are described in more detail in U.S. Pat. No. 6,315,851 (Mazurek et al.).

In some embodiments, the opposing surfaces 240, 242 on the lid 204 and liner 208 include features having undercuts that provide at least some degree of mechanical retention between these opposing surface 240, 242 along directions normal to the mating surfaces. Such undercuts could be provided by either microreplicated or non-microreplicated surfaces. One such microreplicated surface, characterized by mushroom-type hooks, is described in U.S. Pat. No. 5,845,375 (Miller, et al.). In other embodiments, the opposing surfaces 240, 242 may be asymmetric. For example, the opposing surfaces 240, 242 could engage each other using a hook-and-loop mechanism, such as described in European Patent No. EP 0258015 (Ott, et al.).

Figure 8:
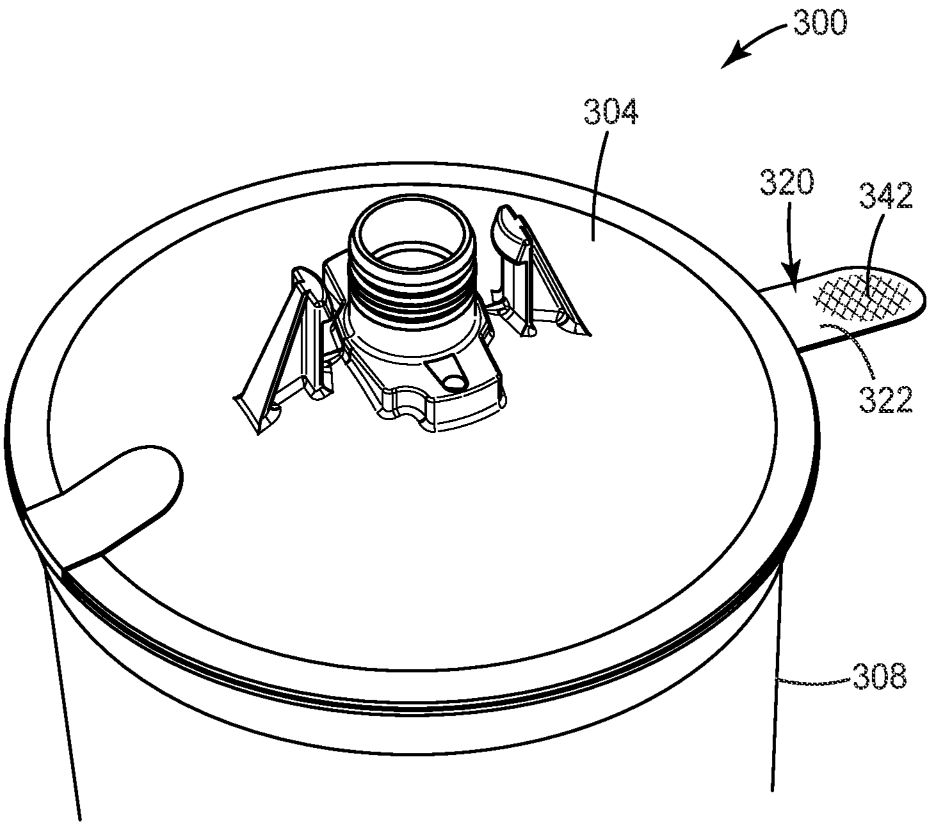
FIG. 8 is a perspective view of a fluid container subassembly according to another exemplary embodiment, looking toward its top and side surfaces.

FIG. 8 shows a container 300 according to still another embodiment having a liner 308 with a pair of hinged tabs 322 similar to those of containers 100, 200. The container 300, however, uses a latch 320 based on a releasable adhesive coupling between the tabs 322 and opposing surfaces of the lid 304. In some embodiments, a pressure sensitive adhesive 342 extends over either or both of the opposing surfaces of the tab 322 and lid 304, conveniently allowing finger pressure to secure the latch 320. Suitable pressure sensitive adhesives include, for example, 300LSE High Strength Acrylic, 300MP High Strength Acrylic, and 350 High Holding Acrylic double-coated adhesive tape provided by 3M Company (St. Paul, MN). Preferably, the pressure sensitive adhesive 342 has sufficient shear bond strength to provide a secure coupling between the lid 304 and the liner 308, yet can be subsequently detached from the lid 304 (or liner 308) to allow an operator to refill the container 300.

Yet another possibility is to provide a latch with a tabbed configuration similar to those in latches 220, 320, but using a hook and loop mechanism to secure the tab to the lid. For example, the tab could include a multiplicity of tiny hooks, while a mating surface on the lid includes a multiplicity of tiny loops that interlock and fasten these surfaces together.

In general, the latches 220, 320 can be released by grasping the distal edge of the tab 222, 322 and gently peeling it away from its opposing surface on the lid 204, 304. In some embodiments, the latch 220, 320 can use microreplicated surfaces, a hook and loop mechanism, or adhesive that is engineered to have a peel bond strength significantly lower than its shear bond strength. This feature can help preserve reliable retention of the lid 204, 304 on the liner 208, 308 under normal operating conditions (which subject the latch 220, 320 to shearing forces) while facilitating peel removal of the tab 222, 322 upon demand.

Use of microreplicated patterns and adhesives need not be exclusive or independent of each other. For example, the opposing surfaces on the tabs 322 and lid 304 could optionally have interlocking microreplicated features, like the latches 220 in the container 200. In some embodiments, one or more latches could use a pressure sensitive adhesive that is itself formed into a microreplicated pattern, as described in U.S. Pat. No. 5,650,215 (Mazurek, et al.). Advantageously, the combination of the pressure sensitive adhesive 342 and interlocking microreplicated features could further enhance the retention between the lid 304 and the liner 308, while retaining the ability to easily release the latch 320.

Further aspects of the containers 200, 300 are essentially analogous to those already described with respect to the container 100 and shall not be discussed here.

Figure 9A:
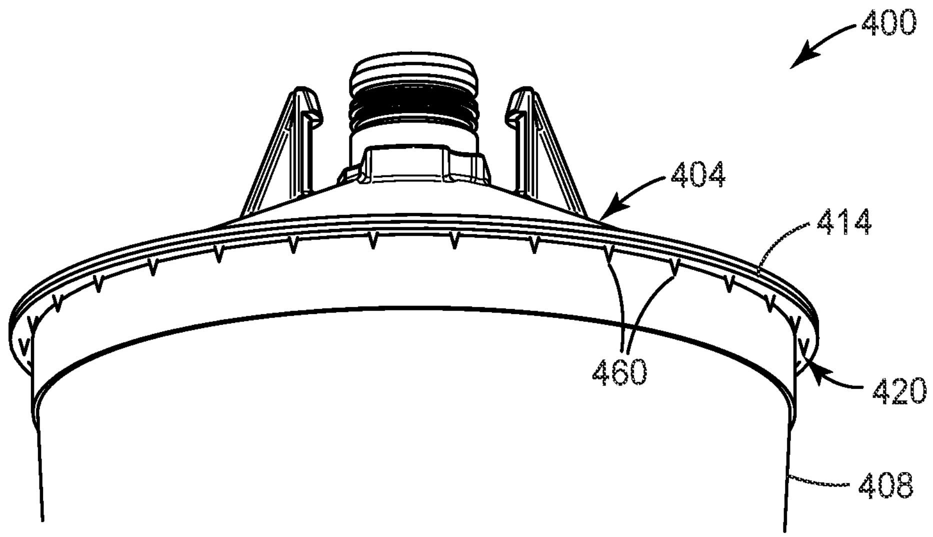
FIGS. 9A and 9B are fragmentary perspective views of a fluid container subassembly according to another exemplary embodiment, looking toward its bottom and side surfaces.
Figure 9B:
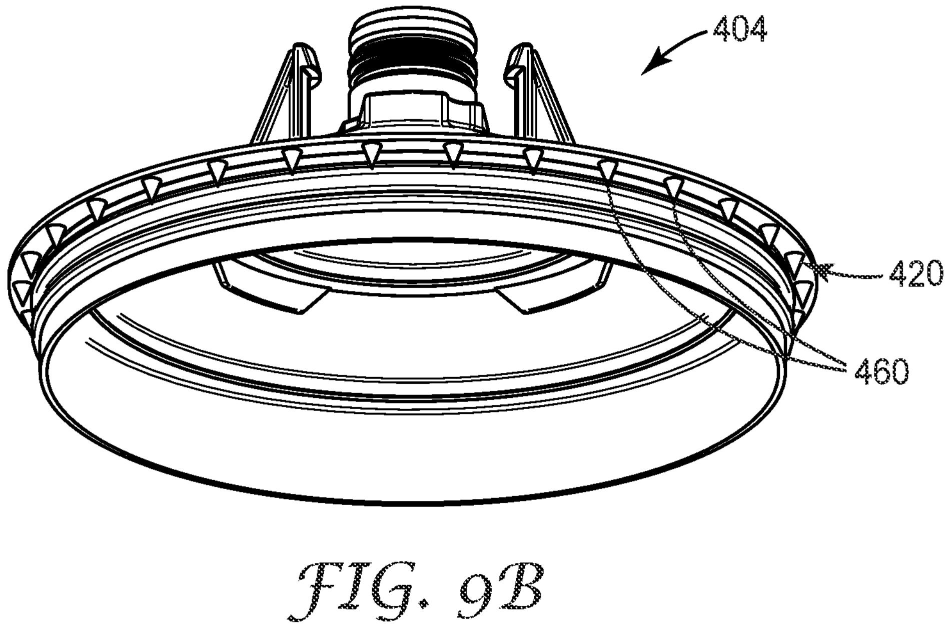

FIGS. 9A and 9B show a container 400 according to yet another embodiment, in which a latch 420, that couples a lid 404 to a liner 408, has an essentially static configuration. In this mechanism, the latch 420 is integrated into the lid 404 and includes a multiplicity of penetrating features 460 that pierce a flange 414 of the liner 408. By extending at least partially through the flange 414, the penetrating features 460 releasably couple the lid 404 to the liner 408 in the manner shown in FIG. 9A. In this embodiment, the penetrating features 460 are generally conical and rely on frictional engagement between the penetrating features 460 and the flange 414 to prevent accidental disengagement between the lid 404 and liner 408. Optionally but not shown, the features 460 could have undercuts to provide increase mechanical retention, as discussed earlier with respect to the microreplicated features of the latch 220.

As another option, the flange 414 of the liner 408 could have registered receptacles (not shown) that engage with the penetrating features 460 when the latch 420 is engaged. The receptacles could be sized to facilitate mutual engagement and disengagement of the lid 404 and the liner 408. Optionally, the receptacles could be disposed in a resilient polymeric material that elastically expands and contracts to facilitate passage of the penetrating features 460 without permanent damage to the flange 414 of the liner 408. As a time-saving feature, the penetrating features 460 could have a configuration whereby the act of securing the outer collar to the rigid cup (for example, by screwing the outer collar onto the cup) induces the latch 420 to assume its closed position by urging the lid 404 towards the liner 408.

It is noted that the penetrating features 460 are distinguishable from features of prior art embodiments because the penetrating features 460 pierce the flange 414 to secure the liner 408 and lid 404 to each other in a reversible manner (e.g. if desired, the penetrating features 460 can be subsequently plucked out of their openings in the flange 414 to remove the lid 404). To avoid interference between the penetrating features 460 and the rim of an outer cup surrounding the liner 408, the rim of the outer cup could include an annular groove that receives the penetrating features 460 when the flange 414 of the liner 408 is compressively secured between the lid 404 and the outer cup.

Figure 10:
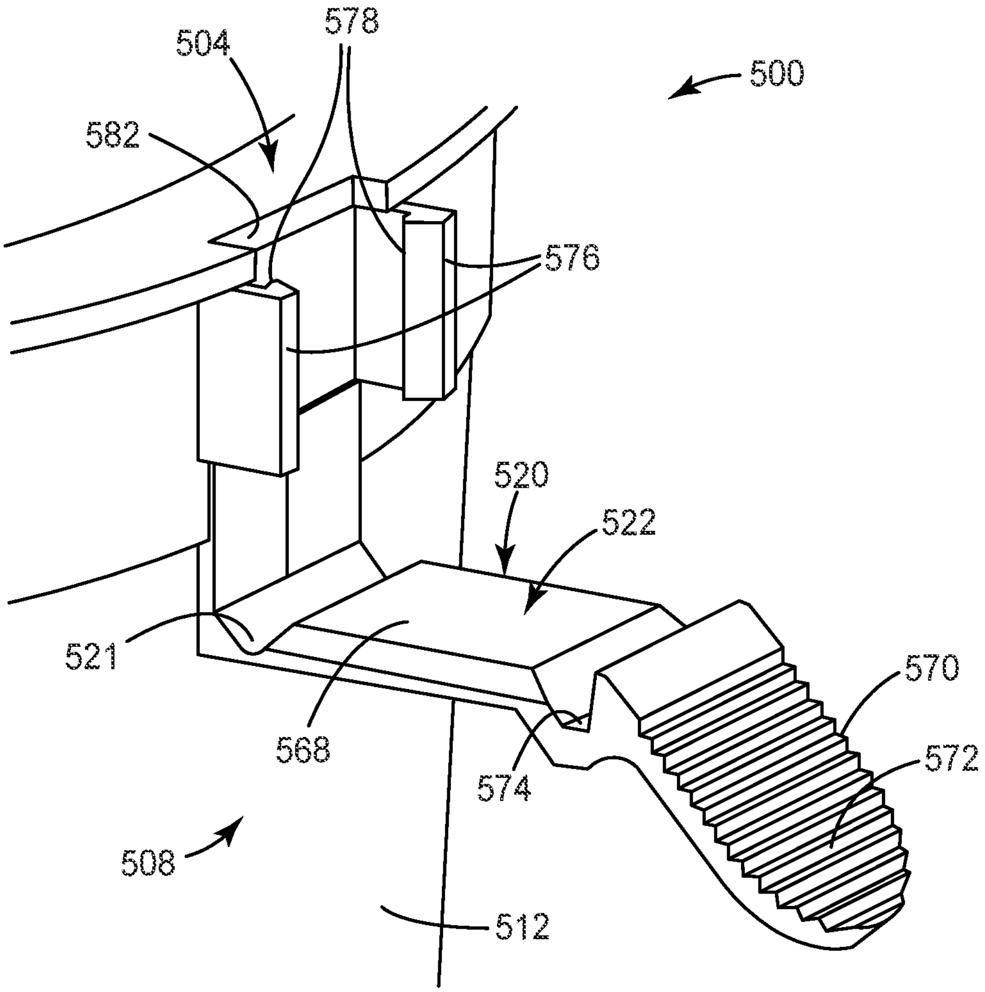
FIG. 10 is a perspective view of a fluid container subassembly according to another exemplary embodiment, looking toward its top and side surfaces.

Yet another embodiment is illustrated in FIG. 10, which shows an enlarged view of a latch 520 integrally formed on a side wall 512 of a liner 508 used with a fluid container 500. Optionally, the latch 520 is made from the same material as the liner 508.

As shown, the latch 520 includes a tab 522 that is coupled to the side wall 512 by a hinge 521 represented by a strip of material with a reduced cross-sectional thickness to facilitate pivoting of the tab 522 relative to the side wall 512. The tab 522 has a generally flat body 568 and a terminal end 570 optionally provided with a friction enhancing texture 572 to assist an operator in grasping the tab 522 between thumb and forefinger without slippage when securing and releasing the latch 520. Located between the body 568 and the terminal end 570 is a clasping feature 574 that has an undercut configuration enabling the clasping feature 570 to extend over the outer edges of the lid 504 when the latch 520 is in its closed position.

To retain the tab 522 in its closed position, in which the latch 520 secures the lid 504 and liner 508 to each other, the side wall 512 of the liner 508 further includes a pair of flexible clips 576. The flexible clips 576 are resilient, clasp-like stubs that project outwardly from the cylindrical side wall 512 and include terminal hooks 578 pointing inwardly toward each other. The hooks 578 engage the lateral sides of the body 568 of the tab 522 in an interference fit when the latch 520 is in its closed position (not shown). Advantageously, the flexible clips 576 allow the latch 520 to be maintained in its closed position even when the tab 522, owing to its resilience, has a bias for springing back toward its open position, shown in FIG. 10. The flexible clips 576 also decrease the likelihood that the tab 522 will spontaneously disengage when suspending the liner 508 by the lid 504, as might be encountered when lifting the liner 508 out of a corresponding cup, particularly when filled with a high-solids coating fluid.

Optionally and as shown, there is a recess 582 in the peripheral edge of the lid 504 to accommodate the tab 522 when the latch 520 is in its closed position. In the depicted embodiment, the recess 582 matingly engages the clasping feature 574 of the tab 522 to help provide a secure coupling. Such a recess may also be present in any of the earlier described lid embodiments to provide sufficient clearance for the hinging of the tab. If so desired, this portion of the tab 522 can be received in the recess 582 such that the tab 522 is flush against the adjacent portion of the lid 504 when the latch 520 is closed, thereby decreasing the overall profile of the latch 520 and minimizing interference between the latch 520 and outer collar (if present).

If an outer collar is present in the embodiment of FIG. 10, it may be desired to incorporate into the outer collar a relief to accommodate the terminal end 570 of the tab 522, particularly if the tab 522 locks in a generally vertical position as shown.

In the aforementioned embodiments, it can be advantageous for the lid, liner, or both to be provided as disposable parts of a spray gun assembly, since these components contact the contents of the container. The cup and collar, which do not normally contact the contents of the container, can be reused. To provide even greater time savings to the end user, the manufacturer could also pre-fill the lid/liner assembly with a fluid to be dispensed, thus allowing an operator to conveniently drop the pre-filled assembly into an outer cup, secure the cup assembly with an outer collar, and then mount it to a suitable spray gun platform.

Any of these components can be manufactured from plastic using any of a number of processing methods known in the art. For example, either or both of the lid and liner can be injection molded in part or in whole. In the embodiment of FIG. 10, it is possible for the liner to include a molded annular structure that is manufactured separately and coupled to the side wall of the liner, where the molded structure provides the latch components that secure to the lid, as illustrated.

In one preferred method of making, the liner is provided by a thermoforming method where the a plastic sheet is heated to a pliable forming temperature, urged against either a positive or negative mold to form the sheet to the desired shape, and then trimmed to create the final product. This process enables the flange and latch to be made integral with the liner. In a preferred embodiment, the tabs of a latch are coplanar extensions of a flange of the liner which are shaped by the molding step or, alternatively, created when the liner is trimmed. The hinge component of a latch may be provided, for example, by thermoforming the liner to include a thin webbing between an outwardly extending tab and a cylindrical side wall.

The aforementioned fluid containers are especially useful in high volume industrial painting applications. The containers facilitate the storage of leftover coating fluids as well as switching out pre-filled fluid containers between spraying operations to reduce or eliminate the lag time associated with repeatedly refilling a lined paint reservoir. The ability to secure the lid and liner of a container for long term storage also creates the possibility of maintaining an inventory of paints that can be rapidly dispensed and exchanged in a series of spraying applications.

In an exemplary method of storing a fluid in a container, an operator can transfer the paint (or some other fluid) into a collapsible liner, place the liner within a rigid cup or frame member, then use a latching member located on either the liner or the lid to fasten the liner and lid to each other, as described above. If desired, the liner can then be further secured to the lid by with the assistance of a collar, buckle, or other fastening mechanism as described earlier. If a fluid outlet is built into the lid (as in the embodiments above), a separate cap can be used to seal this opening prior to long term storage of the fluid container and its contents.

Advantageously, if the liner is self-supporting, the paint transfer step can occur either before or after the placement of the liner in the cup or frame member. Further, it is contemplated that the fluid container may not require the assistance of an additional fastening mechanism where the latch or latches maintain and/or enhance the fluid-tight seal between the liner and lid of the container.

As a general remark, the latching members described above can be easily reversed without disrupting their function. For example, the pivotal tab component of a given latch can be provided on either on the liner or the lid of the fluid container. As another example, the protrusions and receptacles situated on the surfaces of the lid and tab, respectively, may be reversed such that the protrusion is located on the tab while the receptacle is located on the lid.

The latch or latches between the lid and liner could assume various combinations of the above retaining features and mechanisms (e.g. protrusions, undercuts, adhesives, etc.). Moreover, the disclosed retaining features may be mixed and matched with mating surfaces in a manner not expressly shown in the figures. For example, the latch or latches could operate based on a PSA that adheres the flange of a liner to an opposing surface on a lid, or penetrating features could be disposed on respective surfaces of a tab hingedly coupled to the liner.

In the spirit of the aforementioned description, the invention can be further exemplified by one or more of following enumerated embodiments (A-AQ):

A. A liner for a fluid container including: a side wall defining a fluid-containing portion and an open end; a flange extending outwardly from the side wall; and a latching member coupled to the flange, the latching member including a retaining feature for releasably coupling the side wall to a lid compatible with the liner.

B. The liner of embodiment A, where the side wall includes a flexible material that enables the liner to stand self-supported on a horizontal surface yet collapse as fluid within the liner is withdrawn through the open end.

C. The liner of embodiment A or B, where the retaining feature includes a receptacle.

D. The liner of any one of embodiments A-C, where the retaining feature includes a protrusion.

E. The liner of any one of embodiments A-D, where the retaining feature includes a microreplicated surface.

F. The liner of any one of embodiments A-E, where the retaining feature includes a pressure sensitive adhesive.

G. The liner of any one of embodiments A-F, where the retaining feature includes a multiplicity of hooks.

H. The liner of any one of embodiments A-G, where the retaining feature includes a multiplicity of loops.

The liner of any one of embodiments A-H, where the retaining feature includes a multiplicity of penetrating features.

J. The liner of any one of embodiments A-I, where the latching member is an integral component of the flange.

K. A fluid container for a spraying apparatus including: a lid having a fluid outlet adapted to couple the lid to the spraying apparatus; and a liner that collapses as a fluid contained within the liner is withdrawn from the fluid container, where either the liner or lid includes a latch that releasably couples the liner and the lid to each other.

L. The fluid container of embodiment K, further including a rigid outer cup having an open end, where the lid extends over the open end and the liner is received in the outer cup.

M. The fluid container of embodiment L, where the liner has an open end that is generally aligned with the open end of the outer cup.

N. The fluid container of embodiment L or M, further including an outer collar releasably coupled to the outer cup, the outer collar securing both the liner and the lid to the outer cup.

O. The fluid container of embodiment N, where the outer collar is secured to the outer cup by a screw-type mechanism.

P. The fluid container of embodiment N or O, where the liner includes a flange and where the outer collar compresses the flange between the lid and the outer cup to provide an air tight seal between the liner and the outer cup.

Q. The fluid container of embodiment N-P, where the act of securing the outer collar onto the outer cup causes the latch to couple the liner and the lid to each other.

R. The fluid container of any one of embodiments K-Q, where the lid forms a fluid-tight seal against the liner.

S. The fluid container of embodiment 18, where the lid includes an inner collar and the fluid-tight seal is provided by an interference fit between an outer surface of the inner collar and an inner surface of the liner.

T. The fluid container of any one of embodiments K-S, where the latch includes a tab that extends across an outer perimeter of the lid.

U. The fluid container of embodiment T, where the tab includes a first surface and the lid or liner includes a second surface opposed to the first surface, where the first and second surfaces are releasably coupled to each other.

V. The fluid container of embodiment U, where either the first or second surface includes one or more receptacles for receiving one or more respective protrusions located on the opposing liner or lid.

W. The fluid container of embodiment V, where each protrusion is mutually coupled to a respective receptacle by an interference fit.

X. The fluid container of embodiment U, where either the first or second surface includes a pressure sensitive adhesive.

Y. The fluid container of embodiment U, where the first and second surfaces are coupled to each other by a hook and loop mechanism.

Z. The fluid container of embodiment U, where the first and second surfaces are coupled to each other by interlocking microreplicated surfaces.

AA. The fluid container of any one of embodiments T-Z, where the latch further includes a hinge enabling the tab to pivot about the hinge between a first position in which the lid and liner are mutually coupled and a second position in which the lid and liner are not mutually coupled.

AB. The fluid container of embodiment AA, where the tab further includes a distal end whereby the act of pivoting the tab from its first position to its second position includes peeling back the distal end away from the lid.

AC. The fluid container of embodiment K, where the lid includes a first surface, the liner includes a second surface, and where either the first or second surface includes a multiplicity of penetrating features that extend through the opposing first or second surface.

AD. The fluid container of any one of embodiments K-AC, further including a frame member having an open end, where the lid extends over the open end and the liner is received in the frame member, and further where the frame member includes a buckle capable of compressing the liner between the frame member and the lid to provide an fluid-tight seal between the liner and the lid.

AE. The fluid container of any one of embodiments K-AD, where the liner has a capacity of at least 28 fluid ounces.

AF. The fluid container of embodiment AE, where the liner has a capacity of at least 40 fluid ounces.

AG. The fluid container of embodiment AF, where the liner has a capacity of at least 64 fluid ounces.

AH. The fluid container of any of embodiments K-AG, further including a fluid for use with the spraying apparatus received in the liner.

AI. A method of storing a fluid in a container, the method including: transferring the fluid into a collapsible liner; placing the liner at least partially within a rigid outer cup; at least partially covering an open end of the liner with a lid; and moving a latching member of either the liner or the lid from a first position where the liner and lid are separable to a second position where the liner and lid are secured to each other.

AJ. The method of embodiment AI, where the lid includes a fluid outlet adapted to couple the lid to a spraying apparatus.

AK. The method of embodiment AI or AJ, where the latching member includes a tab that extends across an outer perimeter of the lid when the latching member is in its second position.

AL. The method of embodiment AK, where the tab includes one or more receptacles that receive one or more respective protrusions located on the opposing liner or lid when the latching member is in its second position.

AM. The method of any one of embodiments AI-AL, where the liner and the lid are adhesively coupled to each other when the latching member is in its second position.

AN. The method of any one of embodiments AI-AM, where the liner and the lid are coupled to each other by a hook and loop mechanism when the latching member is in its second position.

AO. The method of any one of embodiments AI-AN, where the liner and the lid are coupled to each other by interlocking microreplicated surfaces when the latching member is in its second position.

AP. The method of any one of embodiments AI-AO, where the liner and the lid are coupled to each other by a multiplicity of penetrating features located on a first surface on either the liner or lid, the penetrating features extending through a second surface of the opposing liner or lid when the latching member is in its second position.

AQ. The method of any one of embodiments AI-AP, where the latching member moves from its first position to its second position when the lid is urged against the liner.

All patents and patent applications mentioned above are hereby expressly incorporated by reference. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A fluid container for a spraying apparatus comprising:
- a lid having a fluid outlet adapted to couple the lid to a spraying apparatus, the lid comprising a protrusion located on a top surface of the lid; and
- a liner for the fluid container comprising:
  - a side wall defining a fluid-containing portion and an open end;
  - a flange extending outwardly from the side wall;
  - wherein the liner comprises a tab that extends outwardly from the flange, wherein the tab has a distal end, wherein the distal end extends beyond an outer perimeter of the lid.

2. The fluid container of claim 1, wherein the tab is configured to act as an anchor point that may be pinched between thumb and forefinger of a user for facilitating release of the lid from the liner when there is a tight engagement between the lid and the liner.

3. The fluid container of claim 2, wherein the anchor point is configured to allow a user to hold the liner during separation of the liner from the lid without deforming the liner.

4. The fluid container of claim 1, wherein the tab comprises a receptacle formed within the tab.

5. The fluid container of claim 4, wherein the receptacle is an aperture that passes through the tab.

6. The fluid container of claim 4, wherein the receptacle engages, in encircling relation, the protrusion.

7. The fluid container of claim 4, wherein the protrusion comprises an oversized head relative to a base of the protrusion.

8. The fluid container of claim 7, wherein the oversized head is sized such that there is an interference fit between each receptacle and its mating protrusion.

9. The fluid container of claim 8, wherein the interference fit is configured to prevent the tab from becoming inadvertently detached from the lid.

10. The fluid container of claim 7, wherein the receptacle extends part way through the tab and includes undercut features that engage and retain the oversized head of the protrusion.

11. The fluid container of claim 1, further comprising a rigid outer cup having an open end, wherein the lid extends over an open end and the liner is received in the outer cup.

12. The fluid container of claim 11, wherein the liner has an open end that is aligned with the open end of the outer cup.

13. The fluid container of claim 1, further comprising a frame member having a frame member open end, wherein the lid extends over the frame member open end and the liner is received in the frame member, and further wherein the frame member comprises a buckle capable of compressing the liner between the frame member and the lid to provide a fluid-tight seal between the liner and the lid.

14. The fluid container of claim 1, wherein the lid further comprises an inner collar located on the bottom side of the lid, the inner collar extending along an outer perimeter of the lid and further comprising a raised ridge that extends along the circumference of the inner collar.

15. The fluid container of claim 1, wherein the lid comprises a multiplicity of penetrating features on the bottom side of the lid configured to pierce the flange of the liner.

16. A handheld spray gun assembly comprising:
a spray gun platform;
a fluid adapter coupled to the spray gun platform; and
the fluid container of claim 1, the fluid container is releasably coupled to the fluid adapter.

17. A liner for a fluid container comprising:
a side wall defining a fluid-containing portion and an open end, wherein the side wall includes a flexible material that enables the liner to stand self-supported on a horizontal surface yet collapse as fluid within the liner is withdrawn through the open end;
a flange extending outwardly from the side wall; and
a tab that extends outwardly from the flange, wherein the tab comprises a receptacle formed within the tab wherein the receptacle is an aperture that passes through the tab.

18. The liner of claim 17, wherein the receptacle is configured to engage with, in an encircling relation, a protrusion on a lid.

19. A fluid container for a spraying apparatus comprising:
a lid having a fluid outlet adapted to couple the lid to a spraying apparatus, the lid comprising a protrusion located on a top surface of the lid, wherein the lid comprises a multiplicity of penetrating features on the bottom side of the lid configured to pierce a flange of a liner; and
the liner for the fluid container comprising:
a side wall defining a fluid-containing portion and an open end;
the flange extending outwardly from the side wall.

* * * * *